United States Patent Office 3,068,291
Patented Dec. 11, 1962

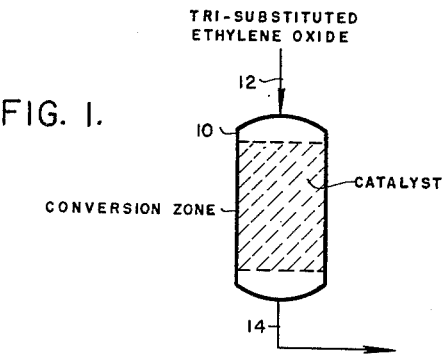

3,068,291
CONVERSION OF EPOXIDES
Emanuel M. Amir, Baytown, Tex., assignor, by mesne assignments, to Esso Research and Engineering Company, Elizabeth, N.J., a corporation of Delaware
Filed Aug. 18, 1958, Ser. No. 755,780
3 Claims. (Cl. 260—593)

This invention relates to the conversion of epoxides. More particularly, this invention relates to the conversion of tri-substituted ethylene oxides and to the separation and recovery of the thus-prepared conversion products.

Trialkyl-substituted ethylene oxides may be characterized as comparatively stable compounds, especially in comparison with terminal and tetra-substituted ethylene oxides. Accordingly, the rearrangement of trialkyl-substituted ethylene oxides presents a serious problem.

It has now been discovered that volatilizable trialkyl-substituted ethylene oxides may be catalytically rearranged with high conversion by bringing the trialkyl-substituted ethylene oxide into contact with finely divided calcined diatomaceous earth at a temperature within the range of about 70° to 600° F.

The starting material of the present invention may be characterized as a compound having the formula:

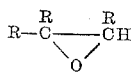

wherein R is an alkyl group.

Preferably, R represents an alkyl group having 1 to 6 carbon atoms; the total number of carbon atoms in the molecule being not more than about 10.

Exemplary of the volatilizable tri-tubstituted ethylene oxides which may be utilized in accordance with the present invention are compounds such as 2-methyl-2,3-epoxypentane, 3-methyl-2,3-epoxypentane, 2-methyl-2,3-epoxybutane, 2- and 3-methyl substituted epoxy hexanes, epoxy heptanes, epoxy octanes, 2- and 3-ethyl, propyl and butyl substituted epoxy pentanes, epoxy hexanes, etc. and mixtures thereof.

The feed stocks of the present invention may consist essentially of the tri-substituted ethylene oxides or may comprise mixtures of tri-substituted ethylene oxides with other hydrocarbon compound types.

The conversion process of the present invention, as indicated, is preferably conducted at a temperature within the range of about 70° to about 600° F. However, a preferred temperature to be utilized within this range is a temperature within the range of about 150° to about 300° F. Pressure and contact time are not critical and may therefore be varied within wide limits.

The catalyst to be utilized is a calcined diatomaceous earth (e.g., diatomaceous earth fired at a temperature in excess of 600° F. sufficient to convert the diatomaceous earth to "fire brick"). A preferred catalyst is a calcined diatomaceous earth treated with a mineral acid such as hydrochloric or nitric acid.

The acid treatment is accomplished by slurrying particulate calcined diatomaceous earth in an aqueous solution of a mineral acid, followed by removal of the aqueous acid by decantation and drying (e.g., at a temperature of 25° to 212° F.).

The conversion products formed by the treatment of tri-substituted ethylene oxides in the presence of calcined diatomaceous earth within the above-indicated temperature range include diolefins, terminal aldehydes, and ketones. The diolefins are useful as monomeric starting materials for the preparation of high molecular weight polymers. The ketones are useful as high boiling solvents and the aldehydes are useful as raw materials for the preparation of acids or highly stable alcoholic solvents.

The invention will be further illustrated with reference to the accompanying drawings wherein:

FIG. 1 is a schematic elevational drawing illustrating the conversion of tri-substituted ethylene oxides in accordance with the present invention; and FIG. 2 is a schematic elevational flow sheet illustrating another modification of the present invention for the conversion of tri-substituted ethylene oxides to dienes, aldehydes, and ketones.

Turning now to FIG. 1, there is schematically shown a conversion zone 10 containing a bed of finely divided catalyst. A volatilizable trialkyl-substituted ethylene oxide containing a total of not more than about 10 carbon atoms per molecule is charged to the conversion zone 10 by way of a charge line 12 and there contacted with the catalyst at a temperature within the range of about 70° to about 600° F. whereby the tri-substituted ethylene oxide is substantially completely converted to dienes, terminal aldehydes, and ketones. The conversion products are discharged from the conversion zone 10 by way of a line 14 leading to a suitable separation zone (not shown) for the separation and recovery of the products.

Turning now to FIG. 2, there is disclosed another embodiment of the present invention disclosing in greater detail a specific manner in which a $C_6$ tri-substituted ethylene oxide may be prepared and converted in accordance with the present invention.

Referring now to FIG. 2, there is shown a polymerization zone 100 containing a bed of an acidic catalyst (e.g., phosphoric acid supported on quartz chips). Propylene is charged to the zone 100 by way of a charge line 102 whereby at least partial polymerization of the propylene to normally liquid polymer products is obtained. A process of this nature is described, for example, in L. F. Brooke U.S. Patent No. 2,500,307, issued March 14, 1950.

The products from the polymerization zone 100 are discharged by way of a line 104 leading to a fractionation zone 106 of any desired construction where the polymerization effluent is fractionated to provide, for example, a light overheads fraction 108, a heavy bottoms fraction 110, and a heart cut distillate fraction 112 boiling within the range of about 155° to about 160° F. This fraction will consist essentially of $C_6$ hydrocarbons and will contain a substantial amount of trialkyl-substituted ethylenes (e.g., 2-methyl and 3-methyl-2-pentene).

The product may also contain significant amounts of $C_6$ paraffins. The distillate fraction 112 is next charged to an oxidation zone 114 wherein it is catalytically oxidized under basic conditions with molecular oxygen in accordance, for example, with the process disclosed in copending E. M. Amir application Ser. No. 709,788, filed January 20, 1958, now U.S. Patent No. 3,007,944 and entitled "Oxidation Process." Briefly, the oxidation reaction is conducted in liquid aqueous phase at a pH within the range of about 7 to 9 and a temperature within the range of about 40° to about 400° F. in the presence of a suitable oxidation catalyst such as a salt of a heavy metal (e.g., cobalt naphthenate).

Thus, with reference to FIG. 2, oxygen may be added to the oxidation zone 114 by way of a charge line 116 and a basic aqueous catalyst solution may be charged by way of a charge line 118.

The oxidation products may be discharged from the zone 114 by way of a line 120 leading to a fractionation zone 122 of any desired construction wherein, again, an overhead fraction 124 and a bottoms fraction 126 may be provided. In addition, there is recovered at least a distillate heart cut fraction 128 boiling within the range of about 200° to about 215° F., such fraction consisting essentially of 2-methyl- and 3-methyl-2,3-epoxypentanes. Paraffins may also be present in the distillate fraction The distillate fraction 128 is then charged to a conversion zone 130 containing a bed of finely divided calcined diatomaceous earth catalyst (e.g., crushed "firebrick") at a temperature within the range of about 240° to about 300° F. As a consequence, the tri-substituted ethylene oxide charge material is substantially quantitatively converted to a mixture of 2- and 3-methyl-1,3-pentadienes, 2,2-dimethyl butanal, 3-methyl-2-pentanone, (methyl-sec. butylketone), and 2-methyl-3-pentanone (ethylisopropylketone). This mixture of compounds may be discharged by way of the line 132 leading to a fractionation zone 134 which may be, for example, a conventional bubble cap tray distillation column wherein the effluent is separated into an overheads methyl pentadiene fraction 136, a heart cut dimethyl butanal fraction 138, and a bottoms ketone fraction 140. If desired, the bottoms ketone fraction may be charged to a suitable splitting zone, such as an efficient distillation column, a fractional crystallization zone, etc. wherein the 2-methyl-3-pentanone may be separated from the 3-methyl-2-pentanone.

The invention will be further illustrated by the following specific examples which are given by way of example and not as limitations on the scope of this invention.

EXAMPLE I

A catalyst was prepared by crushing calcined Celite (i.e., fire-brick) and by treating the crushed fire-brick with nitric acid. The crushed acid-treated fire-brick was then placed in a reactor and 2-methyl-2,3-epoxypentane was passed through the column at a temperature of about 210° F. at a rate sufficient to provide a contact time of more than about 5 minutes. The effluent from the reactor was carefully collected and thereafter fractionated to obtain discreet fractions which were subjected to suitable analysis. The conversion products are set forth in the following table.

*Table I*

| | Weight percent |
|---|---|
| Low boiling hydrocarbons | 0.3 |
| 2-methyl-1,2-pentadiene | 8.5 |
| 2,2-dimethyl-1-butanal | 45.3 |
| 2-methyl-3-pentanone | 45.9 |
| 2-methyl-2,3-epoxypentane | 0.0 |

When the example was repeated using "fire-brick" which had not been acid-treated, equivalent results were obtained.

EXAMPLE II

When 3-methyl-2,3-epoxypentane was substituted for the 2-methyl-2,3-epoxypentane and the example was otherwise repeated, quantitative conversion of the epoxide was obtained, the conversion product having the composition set forth in Table II.

*Table II*

| | Weight percent |
|---|---|
| Low boiling hydrocarbons | 3.1 |
| 3-methyl-1,3-pentadiene | 22.7 |
| 2,2-dimethyl-1-butanal | 36.2 |
| 3-methyl-2-pentanone | 38.0 |
| 3-methyl-2,3-epoxypentane | 0.0 |

In the foregoing examples, it is significant to note that the amount of aldehyde and ketone produced using the catalyst of the present invention is in approximately equal amounts. It is further significant to note that the aldehyde obtained when passing both 2-methyl-2,3-epoxypentane and 3-methyl-2,3-epoxypentane through the column containing the calcined Celite is the same, i.e., 2,2-dimethyl-1-butanal. The fact that the same aldehyde is formed is important since the conversion according to the present invention provides an attractive method of preparing an aldehyde having no alpha-hydrogen.

Having described my invention, what is claimed is:

1. A method for the conversion of 2-methyl-2,3-epoxypentane into a mixture of the corresponding diolefinic, aldehydic and ketonic products which comprises the steps of contacting 2-methyl-2,3-epoxypentane with a calcined diatomaceous earth catalyst at a temperature within the range of about 70° to 600° F., and thereafter recovering the products resulting from said contacting step, said diatomaceous earth having been calcined at a temperature in excess of about 600° F.

2. A method for the conversion of 3-methyl-2,3-epoxypentane into a mixture of the corresponding diolefinic, aldehydic and ketonic products which comprises the steps of contacting 3-methyl-2,3-epoxypentane with a calcined diatomaceous earth catalyst at a temperature within the range of about 70° to about 600° F., and thereafter recovering the products resulting from said contacting step, said diatomaceous earth having been calcined at a temperature in excess of about 600° F.

3. A method for the conversion of a mixture of 2-methyl-2,3-epoxypentane and 3-methyl-2,3-epoxypentane into the corresponding diolefinic, aldehydic and ketonic products which comprises the steps of passing said mixture through a conversion zone containing finely divided calcined diatomaceous earth catalyst at a temperature within the range of about 70° to 600° F., recovering the conversion products from the conversion operation and separating said conversion products into a diolefinic fraction, a single aldehyde fraction consisting essentially of 2,2-dimethyl-1-butanal, and a ketone fraction, said diatomaceous earth having been calcined at a temperature in excess of about 600° F..

References Cited in the file of this patent

UNITED STATES PATENTS

| 1,070,120 | Earle et al. | Aug. 12, 1913 |
| 1,906,833 | Baur | May 2, 1933 |
| 2,106,347 | Groll et al. | Jan. 25, 1938 |
| 2,694,090 | Wild et al. | Nov. 9, 1954 |
| 2,704,774 | Gasson et al. | Mar. 22, 1955 |
| 2,827,498 | Bottoms | Mar. 18, 1958 |

FOREIGN PATENTS

| 566,156 | Germany | Dec. 15, 1932 |